United States Patent Office 3,814,755
Patented June 4, 1974

3,814,755
7 - (o - AMINOMETHYLPHENYLACETAMIDO)-3-(TETRAZOLO[4,5 - b]PYRIDAZIN - 6 - YLTHIO-METHYL)-3-CEPHEM-4-CARBOXYLIC ACID
Takayuki Naito, Tokyo, and Jun Okumura and Hajime Kamachi, Yokohama, Japan, assignors to Bristol-Myers Company, New York, N.Y.
No Drawing. Filed Aug. 30, 1972, Ser. No. 284,792
Int. Cl. C07d 99/24
U.S. Cl. 260—243 C    7 Claims

ABSTRACT OF THE DISCLOSURE

7 - (o - aminomethylphenylacetamido) - 3 - (tetrazolo[4,5-b]pyridazin - 6 - ylthiomethyl)-3-cephem-carboxylic acid and its nontoxic, pharmaceutically acceptable salts and especially its dimethanesulfonate derivative are valuable as antibacterial agents, as nutritional supplements in animal feeds and as therapeutic agents in poultry and animals, including man, and are especially useful in the treatment of infectious diseases caused by many Gram-positive and Gram-negative bacteria. 7-(o-aminomethylphenylacetamido) - 3 - tetrazolo[4,5-b]pyridazin-6-ylthiomethyl)-3-cephem-4-carboxylic acid is prepared, for example, by treatment at 0° C. with trifluoroacetic acid of the corresponding compound in which the free amino group is protected with a tert.-butoxycarbonyl group.

BACKGROUND OF THE INVENTION (1) Field of the invention

The cephalosporins of the present invention possess the usual attributes of such compounds and are particularly useful in the treatment of bacterial infections.

(2) Description of the prior art

Cephalothin and cephaloridine are well-known antibacterial agents; see U.S. Pats. 3,218,318; 3,449,338 and 3,498,979. The patent literature also contains considerable data on cephaloglycin and cephalexin; see U.S. Pats. 3,303,193; 3,422,103; 3,364,212 and 3,507,861 and Great Britain 985,747; 1,054,806 and 1,174,335 and Belgium 696,026 (Farmdoc 29,494) and South Africa 67/1260 (Farmdoc 28,654). Newer cephalosporins include cefazolin and cephapirin; see U.S. Pat. 3,516,997 [and also Netherlands 68/05179 (Farmdoc 34,328) and South Africa 68/4513] and U.S. Pat. 3,422,100.

The literature on cephalosporins has been reviewed, for example, by E. P. Abraham, Pharmacol. Rev. 14, 473–500 (1962), by I. M. Rollo, Ann. Rev. Pharmacol. 6, 218–221 (1966), by E. P. Abraham, Quart. Rev. (London) 21, 231 (1967), by E. Van Heyningen, Advan. Drug Res., 4, 1–70 (1967), by G. T. Stewart, The Penicillin Group of Drugs, Elsevier Publishing Company, New York, New York (1965) at pages 185–192 and briefly in Annual Reports in Medicinal Chemistry, Academic Press, Inc., 111 Fifth Avenue, New York, N.Y., 10003, by L.C. Cheney on pages 96–97 (1967), by K. Gerzon and R. B. Morin on pages 90–93 (1968), by K. Gerzon on pages 78–80 (1969) and by L. H. Conover on pages 101–102 (1970). New cephalosporins are frequently reported at the annual Interscience Conference on Antimicrobial Agents and Chemotherapy as illustrated by Sassiver et al., Antimocrobial Agents and Chemotherapy—1968, American Society for Microbiology, Bethesda, Md., pages 101–114 (1969) and by Nishida et al., ibid, 236–243 (1970). Two excellent recent reviews are The Cephalosporins Microbiological, Chemical and Pharmacological Properties and Use in Chemotherapy of Infection, L. Weinstein and K. Kaplan, Annals of Internal Medicine, 72, 729–739 (1970) and Structure Activity Relationships Among Semisynthetic Cephalosporins, M. L. Sassiver and A. Lewis, Advances in Applied Microbiology, edited by D. Perlman, 13, 163–236 (1970), Academic Press, New York.

7-phenylacetamidocephalosporanic acid has also been named N-phenylacetyl derivative of 7-ACA, cephaloram, PACA and apparently phenasporin. Publications in the scientific literature on the preparation and/or properties of this compound, with or without substituents in the benzene ring, and corresponding compounds in which the 3-acetoxymethyl group has been replaced by methyl, hydroxymethyl and/or pyridiniummethyl include the following:

Chauvette, R.R. et al., "Chemistry of Cephalosporin Antibiotics II. Preparation of a New Class of Antibiotics and the Relation of Structure to Activity," Journal of the American Chemical Society, 84, 3401–3402 (1962).

Chauvette, R. R. et al., "Structure-Activity of Relationships Among 7-Acylamidocephalosporanic Acids," Antimicrobial Agents and Chemotherapy—1962, 687–694.

Cocker, J. D. et al., "Cephalosporanic Acids. Part II. Displacement of the Acetoxy-Group by Nucleophiles," Journal of the Chemical Society, 5015–5031 (1965).

Cocker, J. D. et al., "Cephalosporanic Acids. Part IV. 7-Acylamidoceph-2-em-4-Carboxylic Acids," Journal of the Chemical Society, 1142–1151 (1966).

Culp, H. W. et al., "Metabolism and Absorption of the 7-(Phenylacetamido-1-$C^{14}$)-Cephalosporanic Acid," Antimicrobial Agents and Chemotherapy—1963, 243–246.

Jago, M., "Antibacterial Activity of Some Derivatives of 7-Aminocephalosporanic Acid Against Staphylococcus aureus and Synergism Between These and Other Antibiotics," Brit. J. Pharmacol., 22, 22–23 (1964).

Loder, B. et al., "The Cephalosporin C Nucleus (7-Aminocephalosporanic Acid) and Some of Its Derivatives," Biochemical Journal, 79, 408–416 (1961).

Nishida, M. et al., "Studies on Microbial Degradation of Cephalosporanic C Derivatives II," The Journal of Antibiotics, 21, 357–378 (1968).

Nishida, M. et al., "Studies of Microbial Degradation of Cephalosporin C Derivatives I," The Journal of Antibiotics, 21, 165–169 (1968).

Spencer, J. L. et al., "Chemistry of Cephalosporin Antibiotics VIII. Synthesis and Structure-Activity Relationships of Cephaloridine Analogues," Antimicrobial Agents and Chemotherapy—1966, 573–580.

Stedman, R. J. et al., "7-Aminodesacetoxycephalosporanic Acid and Its Derivatives," J. Med. Chem. 7(1), 117–119 (1964).

Sullivan, H. R. et al., "Metabolism of Oral Cephalothin and Related Cephalosporins in the Rat," Biochemical Journal, 102, 976–982 (1967).

Vymola, F. et al., "The Classification and Characteristics of Cephalosporin Antibiotics I. Systematic Study of the Quantitative Sensitivity of Some Pathogenic Microorganisms to Cephaloridine," Journal of Hygiene, Epidemiology, Microbiology and Immunology, 10, 180–189 (1966).

Many other 7-acyl derivatives of 7-aminocephalosporanic acid have been reported in the patent literature including 7-[4-(α - aminoalkyl)phenylacetamido]cephalosporanic acids (U.S. Pat. 3,382,241), 7-[(p-aminophenylthio)acetamido]-cephalosporanic acid (U.S. Pat. 3,422,100), 7-halophenylthioacetamido)cephalosporanic acids (U.S. Pat. 3,335,136) and the nearly unlimited number of variations of such compounds encompassed by the generic formulae (and often not otherwise described) of such patents as Netherlands 69/02013 (Farmdoc 39,172).
7-(p-aminophenylacetamido)-cephalosporanic acid is disclosed in U.S. Pat. 3,422,103 as is the corresponding N- trityl derivative; see also Japan. 2712/67 (Farmdoc 25,406).

U.S. Pat. 3,219,662 includes claims to compounds of the structure R—CH₂—CO—ACA in which R is phenyl, nitrophenyl (especially para-nitro), chlorophenyl, alkylphenyl and alkoxyphenyl and the corresponding phenoxy and substituted compounds and for all of those the corresponding compounds in which the 3-acetoxymethyl group has been replaced by a 3-pyridiniummethyl group. A more extensive group of such compounds, including the series in which R is phenylthio and also the compounds in which R is benzyl [i.e., 7-(β-phenylpropionamido)cephalosporanic acid], alkoxybenzyl, alkanoyloxybenzyl, aminobenzyl, etc. are disclosed, at least generically, for use as starting materials in Great Britain 1,012,943 and 1,153,421 (Farmdoc 23,984) and see also Great Britain 1,001,478 and U.S. 3,280,118. Additional 7-phenylacetamidocephalosporanic acids having substituents on the benzene ring including hydroxy and amino are disclosed as starting materials in Great Britain 1,082,943 and 1,082,962.

U.S. Pat. 3,341,531 describes the 7-(o-, m- and p-carboxamidomethylphenylacetamido)cephalosporanic acids and their betaines. A variety of 7-(halo-, dihalo- nitro- and halonitro-phenylacetamido)cephalosporanic acids are named as starting materials for reaction with certain nucleophiles in U.S. Pat. 3,431,259 (Farmdoc 27,715). Additional 7-phenylacetamido)cephalosporanic acids having various substituents on the benzene ring are disclosed in Japan 2712/67 (Farmdoc 25,406), Japan 26105/69 (Farmdoc 40,860), Great Britain 1,178,471 (Farmdoc 27,715, see Netherlands 67/00906) and Japan 25785/69 (Farmdoc 40,847).

Replacement of the 3-acetoxy group of a cephalosporin by various heterocyclic thiols has been disclosed.

(a) in South Africa 70/2290 [see also Netherlands 70/05519 (Farmdoc 80,188R)] where the sidechains were, for example 7-α-aminophenylacetamido and typical heterocyclic thiols were 2-methyl-1,3,4-thiadiazole-5-thiol and 1-methyl-1,2,3,4-tetrazole-5-thiol, and (b) in U.S. 3,516,997 where the sidechains at the 7-position had structures such as R³—(alk)m—CO—NH— and R³—S—(alk)m—CO—NH— in which R³ was one of many aromatic heterocycles and the numerous heterocyclic thiols at the 3-position included, for example, 1-methyl-tetrazole-5-thiol and 2-methyl-1,3,4-thiadiazole-5-thiol, and (c) in U.S. Pat. 3,563,983.

U.S. Pat. 3,492,297 includes 7-(p-guanidinophenyl-acetamido)cephalosporanic acid and its betaine.

In cephaloridine the 3-acetoxy group of cephalothin was replaced by a pyridinium group as described, for example, in U.S. Pats. 3,449,338 and 3,498,979.

The preparation of various 7-[α-amino-arylacetamido]cephalosporanic acids and the corresponding desacetoxy compounds in which aryl represents unsubstituted or substituted phenyl or 2- or 3-thienyl is described, for example, in British specifications 985,747; 1,017,624; 1,054,806 and 1,123,333, in Belgian Pat. 696,026 (Farmdoc No. 29,494), in U.S. Pats. 3,311,621; 3,352,858; 3,489,750; 3,489,751; 3,489,752 and 3,518,260, in Japanese Pat. 16871/66 (Farmdoc 23,231), by Spencer et al., *J. Med. Chem.*, 9(5), 746–750 (1966) and by Kurita et al., *J. Antibiotics* (Tokyo) (A) 19, 243–249 (1966) and see also U.S. Pat. 3,485,819.

Netherlands Pats. 68/11676 (Farmdoc 36,349) and 68/12382 (Farmdoc 36,496) and U.S. Pats. 3,489,750 and 3,489,751 and 3,489,752 disclose ring-substituted cephaloglycins.

Various 7-[α-amino-arylacetamido]cephalosporins in which one hydrogen of the α-amino group is replaced by a carbonyl group which is attached in turn to another moiety have been reported. The earliest were the cephaloglycin and cephalexin precursors in which use was made of a common peptide blocking group such as carbobenzyloxy as illustrated by U.S. Pat. 3,364,212, Belgian Pat. 675,298 (Farmdoc 22,206), South African Pat. 67/1260 (Farmdoc 28,654) and Belgian Pat. 696,026 (Farmdoc 29,494). Related compounds include those of U.S. Pats. 3,303,193 and 3,311,621 and 3,518,260.

Various cephalosporins, including cephalosporin C on occasion, have been reacted with nucleophilic, aromatic mercaptans to produce compounds having the structure

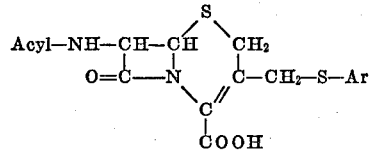

In U.S. Pat. 3,278,531 Ar is phenyl or certain substituted phenyls or certain aromatic heterocyclic rings named, for example, in column 5. Similar nucleophiles, e.g. 2-mercaptopyrimidines, are disclosed in U.S. 3,261,832 and Great Britain 1,101,422 and U.S. 3,479,350 and U.S. 3,502,665, all issued to Glaxo. A parallel disclosure is found in Great Britain 1,109,525 to Ciba, e.g. in definition "h" for R₃. Additional nucleophiles of this type were disclosed by Fujisawa in Belgium 714,518 (Farmdoc 35,307; Netherlands 68/06129 and South Africa 2695/68), in Canada 818,501 (Farmdoc 38,845), in Great Britain 1,187,323 (Farmdoc 31,936; Netherlands 67/14888 and especially in U.S. 3,516,997 (Farmdoc 34,328; Netherlands 68/05179) which includes the compound named cefazolin, which has a tetrazolylacetyl sidechain on the 7-amino group and a 5-methyl-thiadiazolylthiomethyl group at the 3-position and is described at some length in the scientific literature, e.g. in Antimicrobial Agents and Chemotherapy—1969, American Society for Microbiology, Bethesda, Md. at pages 236–243 and in J. Antibiotics (Japan) 23(3), 131–148 (1970).

More recently, replacement of the 3-acetoxy group of a cephalosporin by various heterocyclic thiols has been disclosed in U.S. 3,563,983 and in Netherlands 70/05519 (Farmdoc 80, 188R) where the sidechains were, for example, 7-α-aminophenylacetamido and typical heterocyclic thiols were 2-methyl-1,3,4-thiadiazole-5-thiol and 1-methyl-1,2,3,4-tetrazole-5-thiol; the latter corresponds to U.S. Pat. 3,641,021 issued Feb. 8, 1972 on an application filed Apr. 18, 1969. Additional similar disclosures are found in U.S. Pat. 3,563,983, Belgium 771,189 (Farmdoc 12,817T), Japan 72/05550 (Farmdoc 12,921T) and Japan 72/0551 (Farmdoc 12,922T).

Various cephalosporins having the structure

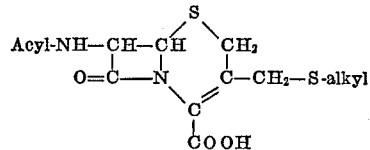

in which acyl represents various sidechains including α-aminophenylacetyl have been described in some of the above and by Glaxo in Belgium 734,532 (Farmdoc 41,619) and in Belgium 734,533 (Farmdoc 41,620) and in U.S. 3,668,203.

Cephalosporins having the structure

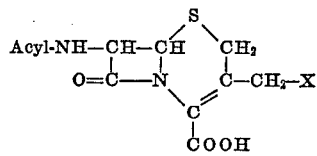

where X includes

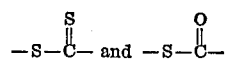

are disclosed in some of the above and in U.S. 3,239,515; 3,239,516; 3,243,435; 3,258,461; 3,431,259 and 3,446,803.

Related publications in the scientific literature include

J. Med. Chem. 8, 174–181 (1965) and J. Chem. Soc. (London) 1595–1605 (1965), 5015–5031 (1965) and 1959–1963 (1967).

6-mercaptotetrazolo[4,5-b]pyridazine was described by B. Stanovnik et al., J. Org. Chem. 35(4), 1138–1141 (1970) as their compound 8 (R=H) under the name 6-mercaptotetrazolo[1,5-b]pyridazine.

SUMMARY OF THE INVENTION

This invention comprises the amphoteric compound of the formula

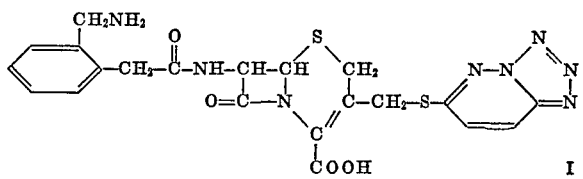

which exists primarily as the zwitterion, its dimethanesulfonate derivative and their nontoxic, pharmaceutically acceptable salts and easily hydrolyzed esters.

Such salts include the nontoxic carboxylic acid salts thereof, including nontoxic metallic salts such as sodium, potassium, calcium and aluminum, the ammonium salt and substituted ammonium salts, e.g. salts of such nontoxic amines as trialkylamines including triethylamine, procaine, dibenzylamine, N-benzyl-beta-phenethylamine, 1-ephenamine, N,N'-dibenzylethylenediamine, dehydroabietylamine, N,N'-bis - dehydroabietylethylenediamine, N-(lower)-alkylpiperidine, e.g. N-ethylpiperidine, and other amines which have been used to form salts with benzylpenicillin; and the nontoxic, acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like.

Also included in this invention are the compounds (used as either intermediates or metabolic precursors) in which the amino group is "blocked" by substituents such as t-butoxycarbonyl, carbobenzyloxy, formyl, o-nitrophenylsulfenyl, β,β,β-trichloroethoxycarbonyl, 4-oxo-2-pentenyl-2, 1-carbomethoxy-1-propenyl-2-and the like. Particularly included in such blocking groups are the ketones (especially acetone) and aldehydes (especially formaldehyde and acetaldehyde) disclosed, for example, in U.S. Pats. 3,198,804 and 3,347,851 and the β-ketoesters and β-diketones disclosed, for example, in U.S. Pat. 3,325,479 and the β-ketoamides disclosed in Japan 71/24714 (Farmdoc 47,321S).

There is also provided, according to the present invention, the process for the preparation of the compound having the formula

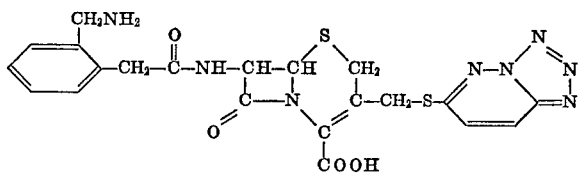

and the nontoxic salts and easily hydrolyzed esters thereof which comprises reacting the compound of the formula

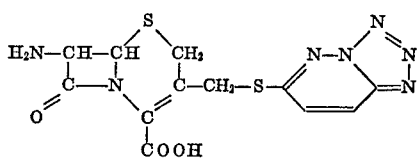

or a salt or easily hydrolyzed ester thereof with an acylating derivative of the acid (in which the amino group is protected) having the formula

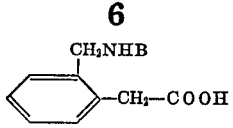

wherein B represents the amino-protecting group (that is, with that acid or its reactive derivative substituted at the carboxyl group) to produce the compound (in which the amino group is protected) having the formula

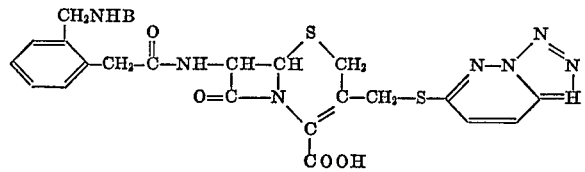

or the corresponding salt or easily hydrolyzed ester thereof wherein B represents the amino-protecting group, and subsequently subjecting the resulting compound to chemical removal of the amino-protecting group, that is, subjecting the resulting compound to elimination reaction of the protecting group.

The amphoteric compound of the present invention is prepared according to the present invention by coupling with a particular 3-thiolated-7-aminocephalosporanic acid designated II, that is, 7-amino-3-(tetrazolo[4,5-b]pyridazin-6-ylthiomethyl)-3-cephem-4-carboxylic acid or a salt or easily hydrolyzed ester thereof (including, but not limited to, those of U.S. Pat. 3,284,451 and U.K. 1,229,453 and any of the silyl esters described in U.S. Pat. 3,249,622 for use with 7-aminopenicillanic acid and used in Great Britain 1,073,530 and particularly the pivaloyloxymethyl, acetoxymethyl, methoxymethyl, acetonyl, phenacyl, p-nitrobenzyl and β,β,β-trichloroethyl esters) a particular acid or its functional equivalent as an acylating agent for a primary amino group. After coupling, the blocking group is removed to give the desired product. Said acid has the formula

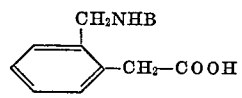

wherein B represents a blocking group of the type used either in peptide syntheses or in any of the numerous syntheses of ampicillin or cephaloglycin or cephalexin from 2-phenylglycine. Particularly valuable blocking groups are a proton, as in the compound of the formula

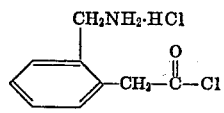

or a β-diketone or β-ketoester as in Great Britain 1,123,-333 and U.S. 3,325,479 and U.S. 3,316,247, e.g., methyl acetoacetate, or a β-ketoamide as in Japan 71/24714 (Farmdoc 47,321S) in which case the acid containing the blocked amino group is preferably converted to a mixed anhydride, as with ethyl chloroformate, before reaction with compound II or a salt thereof to form the desired product I after acid cleavage.

Further to the disccussion above of blocking groups used on the free amino group of the sidechain acid during its coupling with compound II, the blocking group is then removed to form the products of the present invention, e.g., the t-butoxy-carbonyl group is removed by treatment with formic acid, the carbobenzyloxy group is removed by catalytic hydrogenation, the 2-hydroxy-1-naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with compound II, functional equivalents include the corresponding acid anhydrides, including mixed anhydrides and particularly the mixed anhydrides prepared from stronger acids such as the lower aliphatic monoesters of carbonic acid, or alkyl and aryl sulfonic acids and of more hindered acids such as diphenylacetic acid. In addition, an acid azide or an active ester or thioester (e.g., with p-nitrophenyl, 2,4-dinitrophenol, thiophenol, thioacetic acid) may be used or the free acid itself may be coupled with compound II after first reacting said free acid with N,N'-dimethylchloroformiminium chloride [cf. Great Britain 1,008,170 and Novak and Weichet, *Experientia XXI*, 6, 360 (1965)] or by the use of enzymes or of an N,N'-carbonyldiimidazole or an N,N'-carbonylditriazole [cf. South African patent specification 63/2684] or a carbodiimide reagent [especially N,N'-dicyclohexylcarbodiimide, N,N'-diisopropylcarbodiimide or N-cyclohexyl-N'-(2-morpholinoethyl)carbodiimide; [cf. Sheehan and Hess, *J. Amer. Chem. Soc.*, 77, 1067 (1955)], or of alkylamine reagent [cf. R. Buijle and H. G. Viehe, *Angew, Chem. International* Edition 3, 582, (1964)] or of an isoxasolium salt reagent [cf. R. B. Woodward, R. A. Olofson and H. Mayer, *J. Amer. Chem. Soc.*, 83, 1010 (1961)], or of a ketenimine reagent [cf. C. L. Stevens and M. E. Mond, *J. Amer. Chem. Soc.*, 80, (4065)].

Another equivalent of the acid chloride is a corresponding azolide, i.e., an amide of the corresponding acid whose amide nitrogen is a member of an quasiaromatic five membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolide. The by-product, imidazole, precipitates and may be separated and the imidazolide isolated, but this is not essential. The methods for carrying out these reactions to produce a cephalosporin and the methods used to isolate the cephalosporin so produced are well known in the art.

Mention was made above of the use of enzymes to couple the free acid with its blocked amino group with compound II. Included in the scope of such processes are the use of an ester, e.g. the methyl ester, of that free acid with enzymes provided by various microorganisms, e.g. those described by T. Takahashi et al., *J. Amer. Chem. Soc.*, 94(11), 4035–4037 (1972) and by T. Nara et al., *J. Antibiotics (Japan)* 24(5), 321–323 (1971).

There is also provided, according to the present invention, the process of preparing the compound of the formula

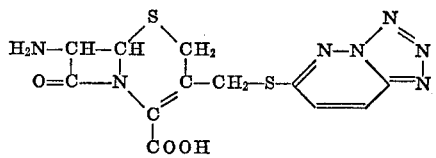

which comprises allowing 7-aminocephalosporanic acid or a salt thereof to react with the thiol of the formula

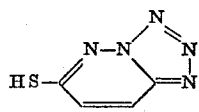

or a sodium or potassium salt thereof.

In the treatment of bacterial infections in man, the compounds of this invention are administered parenterally, in accordance with conventional procedures for antibiotic administration, in an amount of from about 5 to 200 mg./kg./day and preferably about 5 to 20 mg./kg./ day in divided dosage, e.g. three to four times a day. They are administered in dosage units containing, for example, 125, 250 or 500 mg. of active ingredient with suitable physiologically acceptable carriers or excipients. The dosage units are in the form of liquid preparations such as solutions or suspensions.

STARTING MATERIALS

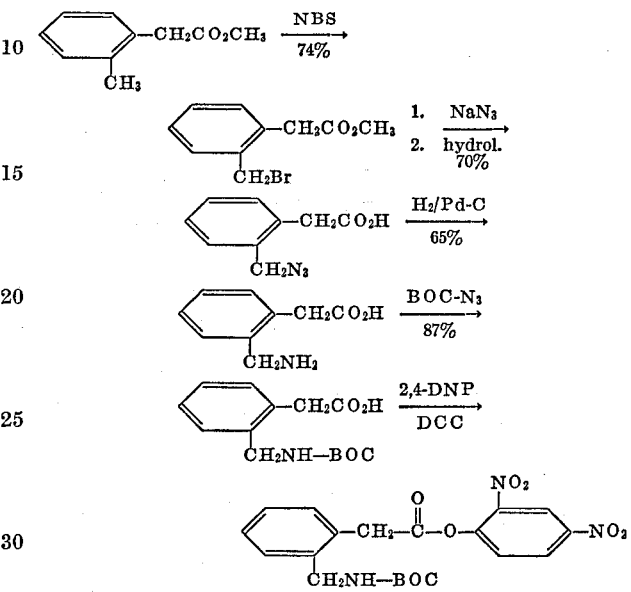

Methyl o-bromomethylphenylacetate

A mixture of methyl o-methylphenylacetate (82.0 g., 0.50 mole), N-bromosuccinimide (89.0 g., 0.50 mole), benzoyl peroxide (1.0 g.) and carbon tetrachloride (800 ml.) was heated under reflux for 2 h. while irradiated with a 750 watt light source. The succinimide was removed by filtration, the solvent removed from the filtrate and the residue distilled *in vacuo* to give 90.1 g. (74%) of product, B.P. 95–105° (0.4 mm.); N.M.R. (CCl$_4$): singlets at τ 2.85 (4H), 5.50 (2H), 6.31 (2H) and 6.38 (3H).

o-Azidomethylphenylacetic acid

A mixture of methyl o-bromomethylphenylacetate (90.1 g., 0.371 mole), sodium azide (26.0 g., 0.40 mole) and 10% aqueous acetone (750 ml.) was stirred at room temperature for 3 h. The solvent was removed under reduced pressure and the residue treated with ether (300 ml.) and water (100 ml.). The crude methyl o-azidomethylphenylacetate (74.8 g.), obtained after drying and concentrating the ether solution, was dissolved in 150 ml. of methanol. This solution was cooled in ice and treated with 150 ml. 3 N methanolic sodium hydroxide. The mixture was left at room temperature for 1 h., then concentrated to dryness and the residue dissolved in water. The aqueous solution was acidified, the product collected by filtration, dried and recrystallized from ethyl acetate-n-hexane to give 49.5 g. (70%) of the acid, M.P. 116–118°; N.M.R. (CDCl$_3$): sharp singlets at τ 2.75 (4H), 5.63 (2H) and 6.28 (2H);

$\nu_{max}^{Nujol}$ 2100 and 1700 cm.$^{-1}$

*Analysis.*—Calcd. for C$_9$H$_9$N$_3$O$_2$: C, 56.53; H, 4.75; N, 21.98. Found: C, 56.37; H, 4.65; N, 21.74.

o-Aminomethylphenylacetic acid

A mixture of o-azidomethylphenylacetic acid (9.6 g., 0.050 mole), 10% Pd on charcoal (2.5 g.), methanol (150 ml.) and 1 N hydrochloric acid (50 ml.) was hydrogenated at 30 p.s.i. for 3.5 h. The mixture was filtered, concentrated under reduced pressure to a volume of approximately 30 ml. and extracted with ether. From the ether extract 1–2 g. of impure starting material was recovered. The aqueous solution was adjusted to pH 5.0 with dilute ammonium hydroxide and cooled in ice. The white solid precipitate was collected by filtration, washed successively with ice-water, methanol and ether, and dried in vacuo over $P_2O_5$: Yield 5.4 g. (65%), M.P. 179–181° (decomp.); N.M.R. ($CF_3CO_2H$): τ 2.54 (s, 4H) 5.48 (q, 2H) and 6.00 (s, 2H).

o-Tert-butoxycarbonylaminomethylphenylacetic acid

Triethylamine (14.4 g., 0.143 mole) was added to an ice-cooled suspension of o-aminomethylphenylacetic acid (10.3 g., 0.0624 mole) in 100 ml. of water followed by the addition of a solution of tert-butoxycarbonyl azide (11.4 g., 0.080 mole) in 75 ml. of THF. The reaction mixture was stirred at room temperature for 16 h., then most of the THF was removed under reduced pressure. The aqueous solution was washed with ether, layered with 125 ml. of ethyl acetate and with ice-cooling brought to pH 3.5 with dilute hydrochloric acid. The ethyl acetate solution was dried, concentrated and the solid residue recrystallized from ethyl acetate-n-hexane (1:1) to give 14.4 g. (87%) of white needles M.P. 114–116°.

Analysis.—Calcd. for $C_{14}H_{19}NO_4$: C, 63.39; H, 7.22; N, 5.28. Found: C, 63.44; H, 7.21; N, 5.42.

2,4-dinitrophenyl o-tert.-butoxycarbonylaminophenyl-acetate

N,N′-dicyclohexylcarbodiimide (1.0 g., 0.0050 mole) was added to an ice-cooled solution of o-tert-butoxycarbonylaminomethylphenylacetic acid (1.33 g., 0.0050 mole) and 2,4-dinitrophenol (0.92 g., 0.0050 mole) in 12 ml. of anhydrous tetrahydrofuran. The reaction mixture was kept at room temperature for one hour, then the precipitated N,N′-dicyclohexylurea was removed by filtration. The solvent was removed from the filtrate to give the activated ester as a viscous yellow oil.

o-Tert. - butoxycarbonylaminomethylphenylacetic acid can be prepared in quantitative yield from tert.-butoxycarbonyl azide and the amino acid by using triethylamine as the base.

The BOC-amino acid reacts with thionyl chloride in the presence of triethylamine (methylene chloride as solvent) or pyridine (benzene as solvent) to give the BOC-amino acyl chloride which can be directly coupled with the compound of the formula

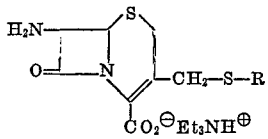

wherein R has the meaning set out above in methylene chloride solution in the presence of triethylamine. The protecting group can subsequently be removed by treatment with cold trifluoroacetic acid.

Exactly 200 g. of 7-aminocephalosporanic acid (7-ACA) was suspended in 500 ml. of acetone and a solution of 240 g. of p-toluenesulfonic acid in 500 ml. of acetone was added in one charge. After stirring for five minutes, at room temperature, the mixture was filtered through diatomaceous earth ("Super Cel") and the bed washed with 150 ml. of acetone (the insoluble matter weighed about 30 g.). Then 80 ml. of water was added to the filtrate and, while stirring, the p-toluene-sulfonate salt crystallized out after scratching on the inside of the flask with a glass rod. The suspension was stirred in an ice-salt bath for thirty minutes and filtered cold. It was washed with 2× 200 ml. of cold acetone (0° C.) and air dried; yield 250 g. of salt. This p-toluene sulfonate salt of 7-ACA was stirred in 2 liters of methanol and the insoluble matter filtered through "Super Cel." The filtrate was placed in a five liter 3 neck flask and 2 liters of water were added. Then the pH was adjusted to 4 by the addition of concentrated ammonium hydroxide with cooling and the suspension stirred for one hour at 0° C. The product was collected by filtration and washed with 2× 100 ml. $H_2O$ (0° C.) and 3× 1 liter acetone (room temperature). After air drying, the yield of 7-ACA was 145 g.

o-Aminomethylphenylacetic acid is also provided by Beckmann rearrangement of 2-indanone oxime followed by hydrolysis of the resulting lactam according to the following equation:

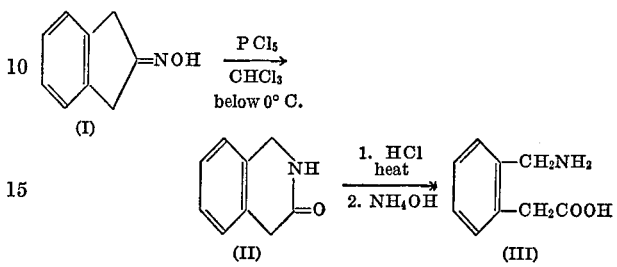

J. Org. Chem. 9, 380–391 (1944) and 28, 2797–2804 (1963).

| Materials | Wt., g. | Vol., ml. | Moles |
|---|---|---|---|
| 2-indanone oxime | 1.000 | | 6.78 |
| Phosphorus pentachloride | 1.482 | | 7.13 |
| Chloroform | | 56.600 | |
| 10% sodium hydroxide solution | | 680 | |
| "Darko KB" activated charcoal | 1.000 | | |

Procedure

1. Dissolve 1000 g. of 2-indanone oxime in 31600 ml. of chlorform at 20–25° C.

2. Cool the solution to −30° C. [On cooling the 2-indanone oxime solution to −30° C., some of the oxime crystallizes.]

3. Add 1482 g. of phosphorus pentachloride to the vigorously stirred suspension in portions. Control the temperature of the reaction at −28° to −32° C. by the rate of addition of the solid phosphorus pentachloride. [The best results were obtained on running the reaction at −30° C. It can also be successfully run at −10 to −5° C. or perhaps even higher but it appears that more tar and side products are produced which then complicate isolating the lactam.]

4. Stir the reaction at ∼−30° C. for 10 minutes after completing the addition and then warm it to 25° C. over ¾ hr. During this period the solids dissolve and then a new solid reprecipitates.

5. Stir the reaction at 25° C. for 3 additional hours and then with thorough mixing add it to 31600 ml. of water at 0–5° C. [The reaction can be followed by TLC (thin layer chromatography). In the system of 8 parts benzene and 2 parts acetic acid the lactam has an $R_f$=.36 and the oxime has an $R_f$=.64. The spots are developed by .05% potassium permanganate spray. The oxime spot may not completely disappear but it should become quite faint.] Subsequent washing operations were conducted at 20–25° C.

6. Separate the layers and wash the chloroform phase with 15800 ml. of water.

7. Combine the water fractions and extract them with 15800 ml. of chloroform.

8. Combine the chloroform fractions, layer with 15800 ml. of water and with good mixing, titrate the mixture to ∼ pH 7 with 10% sodium hydroxide solution. This may take about 680 ml. of sodium hydroxide solution and the titration is slow. [This basic wash is important in removing the tar producing side products. The titration may take 1 to 2 hours.]

9. Separate the layers and wash the chloroform with 15800 ml. of water.

10. Combine the water fractions, wash with 9200 ml. of chloroform and combine the chloroform fractions.

11. Carbon treat the chloroform solution with 1000 g. of activated charcoal ("Darko KB") at ∼25° for 15–30 min.

12. Filter the slurry through diatomaceous earth ("Dicalite") wash the cake with chloroform and concentrate the filtrate at reduced pressure to leave o-aminomethylphenylacetic acid lactam as a dry solid.

13. The yield of crude lactam is nearly 100%. It is a yellow crystalline solid. [If the tar making materials have not been removed by the washes, this product will come out dark. It can be recrystallized from hot water after first adjusting the water slurry to pH 7.0 or from toluene-heptane.]

| Materials | Wt., g. | Vol., ml. | Moles |
|---|---|---|---|
| Crude o-aminomethylphenylacetic acid lactam from 1,000 g. of 2-indanone oxime | ~1,000 | | ~6.78 |
| Conc. hydrochloric acid | | 8,000 | |
| "Darko KB" activated charcoal | 100 | | |
| Methylene chloride | | 6,000 | |
| Methyl isobutyl ketone | | (1) | |
| 6 N ammonium hydroxide | | (1) | |

[1] As needed.

Procedure

1. Add 8000 ml. of concentrated hydrochloric acid to the approximately 1000 g. of crude lactam obtained from oxime rearrangement.

2. Stir the mixture and heat it cautiously to reflux for 3 hours. [On heating this reaction an excessive amount of foam is formed as excess HCl leaves. This foam can fill the whole apparatus. It can be reduced by silicon antifoam agent. After the initial foam stage is passed, the reaction can be refluxed without difficulty.]

3. Cool the dark slurry to about 40–50° C. and add 100 g. of activated charcoal ("Darko KB") and continue stirring.

4. Carbon treat for 15–20 min., filter the slurry through a "Dicalite" cake and wash the cake with about 4000 ml. of hot water.

5. Extract the clear yellow filtrate with 6000 ml. of methylene chloride (½ volume) and separate the methylene chloride. Save the $CH_2Cl_2$ layer for checking possible recovery of unchanged lactam.

6. Concentrate the water phase at reduced pressure to give solid o-aminomethylphenylacetic acid hydrochloride.

7. Add MIBK to the wet solids and continue the reduced pressure distillation and MIBK addition until all the water has been removed from the solids.

8. Continue the reduced pressure distillation until all the MIBK has been removed from the solids. [The MIBK distillation not only azeotropes the water but also takes excess HCl with it.]

9. Redissolve the solids in 3900 ml. of water and add 650 ml. of MIBK.

10. While stirring at 20–25 C. adjust the pH of the solution to 5.0 with 6 N ammonium hydroxide. The o-aminomethylphenylacetic acid zwitterion starts to crystallize at about pH 3.5.

11. Stir the zwitterion slurry and cool it to 0–5° C. for 1 hr.

12. Filter the slurry, wash the cake carefully with ~1000 ml. of ice cold water, then 2000 ml. of MIBK and then 5000 ml. of ice cold acetone. The combined filtrate and washes should be checked for lactam content.

13. Suck the cake dry and then dry it in an air circulating oven at 45° C. The yield is 670–730 g.; 60–65% based on oxime.

14. The reactions and processing may be followed by TLC using the solvent system 5 acetone, 1.5 benzene, 1.0 acetic acid, 1.5 water; developed by $KMnO_4$; $R_f$ lactam=0.88, $R_f$ amino acid=0.69.

o-Aminomethylphenylacetic acid is also provided by Schmidt rearrangement of 2-indanone followed by hydrolysis of the resulting lactam according to the following equation:

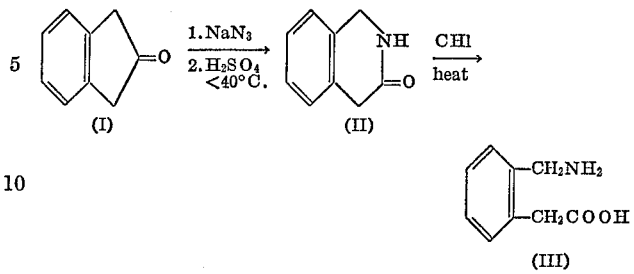

Organic Syntheses 41, 53 (1961).

2-indanone (I) was prepared from indene according to a procedure described in Organic Syntheses (ibid). When a technical grade reagent of indene is used, the yield of 2-indanone will decrease to around 45% (see note 2 of Organic Syntheses). 2-indanone thus prepared was used as soon as possible because of a description in note 7 of Organic Syntheses that 2-indanone is unstable to air at room temperature.

Hydrolysis of the δ-lactam (II) was carried out successfully using hydrochloric acid to give the amino acid (III) in 79% yield. Barium hydroxide was also used for the hydrolysis but the yield was 32%.

o-Aminomethylphenylacetic acid δ-lactam (II)

To a cooled suspension of 12.3 g. (0.093 mole) of freshly prepared 2-indanone (I) and 13.0 g. (0.2 mole) of sodium azide in 500 ml. of chloroform was carefully added dropwise 50 ml. of concentrated sulfuric acid at such a rate as to maintain the temperature below 40° C. under stirring. After the addition was completed and the heat evolution ceased, the mixture was stirred at room temperature for an additional two hours and then poured into 400 g. of crushed ice. The chloroform layer was separated and the aqueous layer was extracted with three 300 ml. portions of chloroform. The chloroform layer was combined with the chloroform extracts, dried with anhydrous sodium sulfate and concentrated under reduced pressure to afford crystalline precipitate, which was collected by filtration and recrystallized from 250 ml. of n-hexane-benzene (1:1) to give 12.0 g. (88%) of the desired product (II). Colorless prisms. M.P. 152–153° C.

IR (KBr): $\nu_{max}$ (cm.$^{-1}$) 3200, 3050, 1660, 1500, 745.

NMR ($CDCl_3$): δ (p.p.m. from TMS) 3.50 (2H, t, 1,5 Hz), 4.40 (2H, br-s, converted to a triplet (J=1.5 Hz) by an addition of $D_2O$), 7.06 (4H, s), 7.45 (1H, br-s, disappeared by an addition of $D_2O$).

Analysis.—Calcd. for $C_9H_9NO$: C, 73.45; H, 6.16; N, 9.52. Found: C, 73.73; H, 6.08; N, 9.23.

o-Aminomethylphenylacetic acid δ-lactam (II)

Ten milliliters of sulfuric acid was added to a stirred suspension of 1.32 g. (0.01 mole) of freshly prepared 2-indanone (I) in 50 ml. of chloroform and to the mixture was added portionwise 1.30 g. (0.02 mole) of sodium azide at room temperature under stirring. After stirring for half an hour, the reaction mixture was poured into 200 ml. of ice-water and extracted with two 100 ml. portions of chloroform. A large amount of insoluble material which appeared during the extraction procedure was filtered off. The chloroform extracts were combined, dried on anhydrous sodium sulfate, treated with active carbon and filtered. Evaporation of the filtrate followed by recrystallization of the residue from 100 ml. of alcohol-n-hexane (1:1) gave the δ-lactam (II) melting at 150–152° C. Yield 0.48 g. (32%).

o-Aminomethylphenylacetic acid (III)

A mixture of 7.37 g. (0.05 mole) of (II) and 50 ml. of concentrated hydrochloric acid was refluxed for 3 hours and the reaction mixture was treated with 1.0 g. of active carbon and filtered. The filtrate was concentrated to dryness under reduced pressure to give 8.5 g. as the crystalline residue. Recrystallization from 400 ml. of aqueous acetone (acetone:water=10:1) gave 8.0 g. (79%) of hydrochloride of the desired amino acid (III). Colorless plates. M.P. 164—166° C.

IR (KBr): $\nu_{max}$(cm.$^{-1}$) 1695, 1610, 1585, 1230, 1180.

NMR (DMSO-d$_6$,): δ(p.p.m. from TMS) 3.69 (2H, s), 3.94 (2H, s), 4.10–4.7 (3H, broad), 7.0–7.5 (4H, m), 7.6–8.7 (1H, broad).

*Analysis.*—Calcd. for $C_9H_{11}NO_2 \cdot HCl$: C, 53.60; H, 6.00; N, 6.95; Cl, 17.58. Found: C, 53.74; H, 5.98; N, 6.79; Cl, 17.94.

o-Aminomethylphenylacetic acid (III)

A mixture of 340 mg. (2.3 mmoles) of (II) and 730 mg. (2.3 mmoles) of barium hydroxide octahydrate in 20 ml. of water was heated in a sealed tube at 150° C. for one hour. The reaction mixture was cooled to room temperature and 300 mg. (2.5 mmoles) of ammonium carbonate was added to precipitate barium carbonate which was filtered and washed well with 50 ml. of water. The aqueous filtrate was combined with the washings and evaporated to dryness. The residue was recrystallized from 5 ml. of 50% aqueous alcohol to give 163 mg. (30%) of colorless plates which was identical with the free amino acid obtained from the hydrochloride by neutralization with ammonium hydroxide, M.P. 180–182° C.

IR (KBr): $\nu_{max}$ (cm.$^{-1}$) 3100–2200, 1660–1500, 1400, 1380, 770, 755, 720.

NMR (CF$_3$COOH): δ (p.p.m. from TMS) 3.96 (2H, br-s), 4.45 (2H, Br-s), 6.3–8.0 (3H, br), 7.38 (4H, s).

*Analysis.*—Calcd. for $C_9H_{11}NO_2$: C, 65.44; H, 6.71; N, 8.48. Found: C, 65.24; H, 6.47; N, 8.31.

o-Aminomethylphenylacetic Acid Lactam (II)

In a 2 liter three-necked round-bottom flask, fitted with a reflux condenser, drying tubing, overhead stirrer, thermometer, and a 100 ml. dropping funnel, are placed 24.6 g. (0.186 mole) of 2-indanone and 26 g. (0.4 mole) of sodium azide in 1 liter of chloroform. The suspension is stirred and to it added dropwise 100 ml. of concentrated sulfuric acid at such a rate to maintain the temperature between 33–37° C. (Note 1). After the addition is complete the reaction mixture is stirred at room temperature for an additional 2 hours, and then poured into 800 g. of crushed ice. The chloroform layer is separated and the aqueous phase is extracted 3 times with 300 ml. portions of chloroform. The aqueous phase is treated with sodium nitrile (Note 2). The chloroform extracts are combined, dried over magnesium sulfate (anhydrous) and evaporated to dryness. The solid is redissolved in 150 ml. of hot water and treated with 2.0 g. of charcoal ("Darko KB") while hot. The solution is filtered and the charcoal is washed 3 times with 25 ml. portion of hot water. The solution is cooled, and the solid is collected by filtration. It is washed with 10–20 ml. of ice-cold water, and dried in a vacuum desiccator over P$_2$O$_5$. The product melts at 144–145° C.; 18.3 g. (yield 68%).

Notes

1. *Caution:* During the sulfuric acid addition, hydrazoic acid is evolved. Hydrazoic acid boils at 38–39° C., therefore, the temperature must be maintained *below 40° C.* The entire experiment should be carried out in a well ventilated hood.

2. Residual hydrazoic acid in the aqueous phase is decomposed by adding slowly sodium nitrile until a positive test is obtained with iodine paper and/or ferric chloride solution.

o-Aminomethylphenylacetic acid hydrochloride (III)

In a 500 ml. round-bottom flask, fitted with a reflux condenser, and a magnetic stirrer, is placed 10.1 g. (0.075 moles) of (II) and 100 ml. of concentrated hydrochloric acid. The mixture is then refluxed for 3 hours. While hot, the reaction mixture is treated with 2.0 g. of charcoal ("Darko KB") for 5 mintues, and filtered. The filtrate is concentrated to dryness at 50–60°/15 mm. and finally at high vacuum over P$_2$O$_5$ (Note 1). The solid is recrystallized from a preformed mixture of acetone:water, 15:1 (Note 2). The hydrochloride is dried in a vacuum desiccator over P$_2$O$_5$. The yield of the pure product, melting at 188–190°, is 11.4 g. (78%).

*Analysis.*—Calcd. for $C_9H_{12}NO_2Cl$: C, 53.73; H, 5.97; N, 6.96; Cl, 17.66. Found: C, 53.56; H, 6.02; N, 6.89; Cl, 17.76.

Notes

1. For a successful recrystallization absolutely dry material is needed.

2. The ratio of acetone to water may vary, depending on the dryness of the crude hydrochloride.

Preparation of o-aminomethylphenylacetic acid from indene

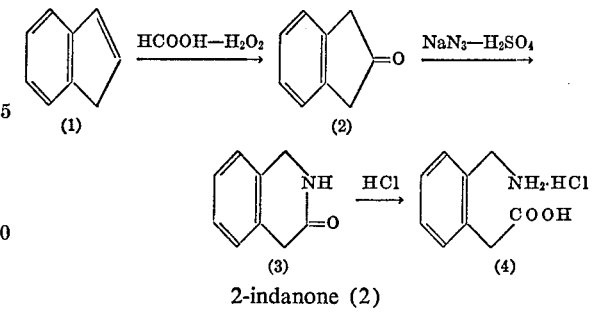

2-indanone (2)

To a stirred mixture of 370 ml. of 80% formic acid and 70 ml. of 30% hydrogen peroxide was added dropwise 58 g. (0.5 mole) of indene (1) at 35–40° C. over a period of one hour. An additional 40 ml. of formic acid was used to rinse the last of the indene from the dropping funnel into reaction flask. The reaction mixture was stirred at room temperature for 15 hours. The mixture was concentrated to remove the formic acid under reduced pressure (20–30 mm.) below 40° C. The residue was dissolved in 1000 ml. of 10% sulfuric acid and that solution was refluxed for 20 minutes and then steam-distilled. The distillation was carried out at the rate of about 2 l. per hour until 7 l. of distillate had been collected. The distillate was extracted with six 400-ml. portions of chloroform. The combined extracts were dried over anhydrous sodium sulfate and filtered. The filtrate was evaporated to dryness to give 50.2 g. (76%) of (2) as pale yellow needles melting at 56–57° C.

o-Aminomethylphenylacetic acid δ-lactam (3)

To a chilled suspension of 46 g. (0.35 mole) of freshly prepared 2-indanone (2) and 27 g. (0.42 mole) of sodium azide in 75 ml. of chloroform was added dropwise 75 ml. of concentrated sulfuric acid at such a rate as to maintain the temperature at 30–40° C. under stirring. After the addition was complete and the evolution of heat ceased, the stirring was continued for an additional 3 hours. The reaction mixture was poured into about one Kg. of crushed ice. The chloroform layer was separated and the aqueous layer was extracted with three 200-ml. portions of chloroform. The chloroform layer was combined with the chloroform extracts, dried over anhydrous sodium sulfate and evaporated to dryness to give 44.5 g. (87%) of (3) as pale yellow prisms melting at 146–149° C.

o-Aminomethylphenylacetic acid hydrochloride (4)

A mixture of 43.4 g. (0.30 mole) of o-aminomethylphenylacetic acid δ-lactam (3) in 140 ml. of 6 N hydrochloric acid was refluxed for 4 hours. The reaction mixture was treated with one g. of charcoal and evaporated to dryness. The residual oil was triturated with 500 ml. of acetone to give 45 g. (75%) of (4) as colorless plates melting at 163–164° C.

Preparation of o-aminomethylphenylacetic acid from o-nitrotoluene

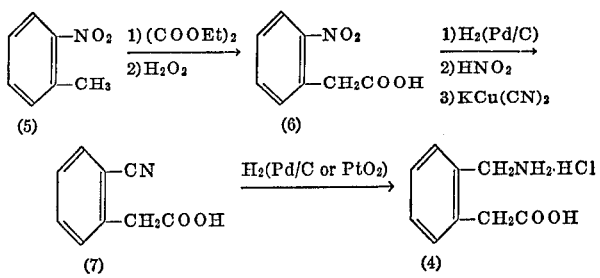

o-Nitrophenylacetic acid (6)

A mixture of 135 ml. (ca. 1 mole) of ethyl oxalate and 118 ml. (ca. 1 mole) of o-nitrotoluene (5) was added dropwise under cooling to a stirred solution of 23 g. (1 g. atom) of sodium in 300 ml. of absolute ethanol and the mixture was stirred for 1.5 hours at room temperature and then refluxed for 1.5 hours. The mixture was cooled to 60° and about 500 ml. of water was added. The mixture was steam-distilled to remove the unreacted nitrotoluene. The residue was treated with 5 g. of active carbon and filtered. The clear filtrate was adjusted to pH 8–9 with dil. sodium hydroxide. A solution of 6% hydrogen peroxide was added at 30–40° C. until a small sample of the reaction mixture when made alkaline with sodium hydroxide no longer gave the dark color characteristic of alkaline pyruvic acids. The reaction mixture was treated with a small amount of active carbon and filtered. The filtrate was acidified with conc. hydrochloric acid and extracted with four 250 ml. portions of ethyl acetate. The combined extracts were washed with water (3 × 100 ml.) and a saturated sodium chloride solution and dried over anhydrous sodium sulfate. The solvent was removed and the residue was crystallized from ethanol-water (200 ml.–600 ml.) to give 81.3 g. (45%) of o-nitrophenylacetic acid (6) melting at 140–141° C. $\nu_{CO}$ 1710 cm.$^{-1}$. $\nu_{NO_2}$ 1525, 1360 cm.$^{-1}$.

o-Cyanophenylacetic acid (7)

A solution of 43.4 g. (0.24 mole) of o-nitrophenylacetic acid (6) and 9.6 g. (0.24 mole) of sodium hydroxide in 200 ml. of water was hydrogenated at room temperature under 50 p.s.i. of hydrogen pressure with one g. of 10% palladium-charcoal. The theoretical amount of hydrogen was absorbed during 4 hours. The catalyst was removed by filtration. To the filtrate was added a solution of 16.6 g. (0.24 mole) of sodium nitrite in 50 ml. of water under cooling at 0° C. The mixture was added dropwise to 80 ml. of conc. hydrochloric acid at 0–3° C. under stirring. After the addition was completed, a chilled solution of 16.6 g. (0.12 mole) of potassium carbonate in 100 ml. of water was added to the reaction mixture with stirring. The diazonium salt solution was added with vigorous stirring at 0–5° C. to a solution of potassium cuprocyanide which was prepared from 40 g. (0.62 mole) of potassium cyanide and 28 g. (0.31 mole) of cuprous cyanide in 130 ml. of water. The mixture was stirred for 30 minutes at 0° C., for one hour at 15–20° C., for one hour at 50° C. and finally stood at room temperature overnight. The reaction mixture was diluted with one l. of water and filtered. The filtrate was acidified with conc. hydrochloric acid and extracted with three 300 ml. portions of ethyl acetate. The combined extracts were back-extracted with four 200 ml. portions of sodium bicarbonate solution. The combined alkaline extracts were treated with a small amount of charcoal, acidified with conc. hydrochloric acid and extracted with three 300 ml. portions of ethyl acetate. The combined extracts were washed with 200 ml. of water and 200 ml. of a saturated sodium chloride solution, dried with anhydrous sodium sulfate and concentrated to give 36 g. of the crude product (7). Recrystallization from benzene gave 29.6 g. (77%) of tan needles melting at 121–122° C. $\nu_{C \equiv N}$ 2220 cm.$^{-1}$, $\nu_{C \equiv N}$ 1960 cm.$^{-1}$.

o-Aminomethylphenylacetic acid hydrochloride (4)

(i) A mixture of 1.6 g. (0.01 mole) of o-cyanophenylacetic acid (7), 2.5 ml. of ethanol and 15 ml. of 6 N hydrochloric acid was hydrogenated with 1 g. of 10% palladium-on-carbon at an ordinary pressure at room temperature. The theoretical volume of hydrogen was absorbed in 18 hours. The catalyst was removed and the filtrate was concentrated to give 1.6 g. (80%) of colorless plates (4) melting at 161–163° C. It was identical with the authentic sample prepared by Schmidt rearrangement of 2-indanone followed by hydrolysis.

(ii) A mixture of 3.2 g. (0.02 mole) of (7), 0.5 g. of 10% palladium on charcoal, 50 ml. of ethanol and 25 ml. of 6 N hydrochloric acid was hydrogenated at room temperature at 50 p.s.i. of hydrogen pressure. The theoretical amount of hydrogen was absorbed in 3 hours. The mixture being filtered to remove the catalyst, the filtrate was concentrated and the residue was triturated with 100 ml. of acetone to give 3.0 g. (75%) of (4) melting at 162–163° C.

(iii) A solution of 3.22 g. (0.02 mole) of (7) in 50 ml. of ethanol and 25 ml. of 6 N hydrochloric acid was hydrogenated at room temperature under 50 p.s.i. of hydrogen pressure using 0.15 g. of platinum oxide as a catalyst. The theoretical amount of hydrogen was absorbed in 4 hours. The catalyst was removed by filtration and the filtrate was evaporated to give a viscous oil which was triturated with 150 ml. of acetone to give 2.1 g. (53%) of colorless plates melting at 161–163° C.

(iv) Platinum oxide (0.1 g.) was added to a solution of 1.6 g. (0.01 mole) of (7) in 20 ml. of ethanol and 20 ml. of 6 N hydrochloric acid and the solution was hydrogenated at an ordinary pressure. The theoretical amount of hydrogen gas was absorbed in 18 hours. The catalyst was filtered off and the filtrate evaporated to dryness. The residue was triturated with 50 ml. of acetone to give 1.0 g. (50%) of (4) melting at 161–163° C.

Preparation of 6-mercaptotetrazolo[4,5-b] pyridazine

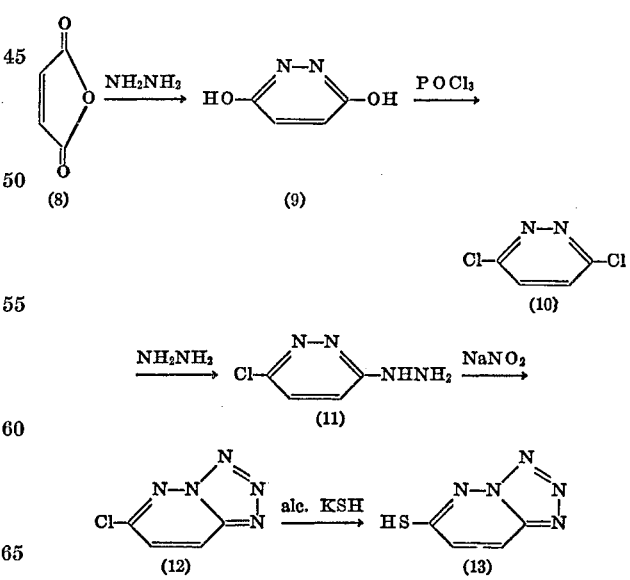

3,6-dihydroxypyridazine (9)

To a boiling solution of 315 g. (3 moles) of hydrazine dihydrochloride in 2 l. of water was added portionwise 295 g. (3 moles) of finely ground maleic anhydride (8) with stirring. After the addition was completed the heating was continued for 4 hours and then allowed to stand overnight in a refrigerator to give 285 g. (85%) of (9) as massive pillars. M.P. >290° C.

3,6-dichloropyridazine (10)

A mixture of 150 g. (1.33 moles) of (9) and 250 g. of phosphorus oxychloride was refluxed for 3 hours under protection from moisture. The excess of phosphorus oxychloride was removed under reduced pressure and the dark residue was poured into one kg. of crushed ice. The resulting precipitate was collected by filtration. The second crop of the product was obtained from the mother liquor by the extraction with five 300 ml. portions of chloroform followed by treating with 1 g. of charcoal and evaporating the solvent. The first and second crops were combined, dissolved in 500 ml. of chloroform and treated again with one g. of charcoal and concentrated to give 165 g. (83%) of (10) as fine needles melting at 60–61° C. (in a sealed tube).

3-chloro-6-hydrazinopyridazine (11)

A mixture of 40 g. (0.27 mole) of 3,6 - dichloropyridazine (10) and 40 ml. of 80% hydrazine hydrate in 80 ml. of ethanol was refluxed for one hour. The reaction mixture was evaporated to dryness and the residue was recrystallized from benzene to give 39 g. (100%) of (11) melting at 114–115° C.

6-chlorotetrazolo[4,5-b]pyridazine (12)

To a solution of 25.7 g. (0.174 mole) of (11) in 100 ml. of 15% acetic acid was added dropwise a solution of 13.8 g. (0.2 mole) of sodium nitrite in 50 ml. of water with vigorous stirring at 5–10° C. Stirring was continued for one hour at the same temperature. The precipitate which separated was filtered, washed with 20 ml. of water and air-dried to give 17.02 g. of (12). Additional product was obtained by evaporation of the filtrate. Total yield 18.32 g. (64%). M.P. 104–105° C.

6-mercaptotetrazolo[4,5-b]pyridazine (13)

A mixture of 21.3 g. (0.137 mole) of (12) and 20 g. (0.25 mole) of potassium hydrosulfide in 200 ml. of ethanol was refluxed for 2 hours and evaporated to dryness. The residue was dissolved in 100 ml. of water and filtered to remove a small amount of insoluble material. The filtrate was acidified to pH 1 with dil. hydrochloric acid to precipitate (4) as colorless needles which were collected by filtration, washed with 20 ml. of water and dried. Yield 9.80 g. (47%). M.P. 140–141° C. (dec.).

IR: $\nu_{max}^{KBr}$ 2500, 1540, 1445, 1295, 840 cm.$^{-1}$.

NMR: $\delta_{ppm.}^{D_2O+K_2CO_3}$ 7.44 (1 H, d, 10 Hz., pyridazine-$\underline{H}$), 7.77 (1 H, d, 10 Hz, pyridazine-$\underline{H}$).

Analysis.—Calcd. for $C_4H_3N_5S$: C, 31.37; H, 1.97; N, 45.72; S, 20.94. Found: C, 31.52; 31.66; H, 1.70, 1.69; N, 46.01, 46.01; S, 20.95.

Preparation of 7-amino-3-(tetrazolo[4,5-b]pyridazin-6-ylthiomethyl)-3-cephem-4-carboxylic acid

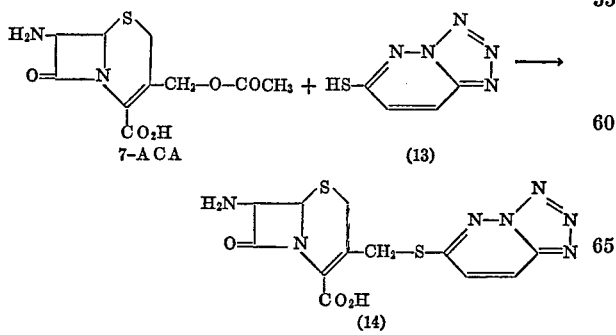

7-amino-3-(tetrazolo[4,5-b]pyridazin-6-ylthiomethyl)-3-cephem-4-carboxylic acid (14)

(i) To a hot solution (50–60° C.) of 9.56 g. (0.062 mole) of (13) and 10.42 g. (0.124 mole) of sodium bicarbonate in 300 ml. of water was added carefully 16.86 g. (0.062 mole) of 7-ACA and the mixture was heated at 80–85° C. for 30 minutes. About 7 g. of sodium bicarbonate was added to the reaction mixture to dissolve insoluble material. The solution was treated with active carbon, filtered and the filtrate was acidified to pH 5 with dil. hydrochloric acid. The precipitate was collected by filtration, washed with water, air-dried and finally in vacuo on $P_2O_5$ to give 14.47 g. (64%) of (14). M.P. 248–250° C. (dec.).

(ii) A stirred solution of 16.8 g. (0.11 mole) of (13) and 18.48 g. (0.22 mole) of $NaHCO_3$ in 1 l. of 0.1 M phosphate buffer (pH 6.4) was heated at 50° C. and to the solution was added portionwise 30 g. (0.11 mole) of 7-ACA. The mixture was heated at 80° C. for 2.5 hours, during which period insoluble material still remained. The reaction mixture was cooled to room temperature and the precipitated (14) was collected by filtration, washed thoroughly with 200 ml. of water and air-dried.

Additional (14) was obtained from the filtrate and the washings by acidifying to pH 5 with dil. HCl. Total yield 32.9 g. (83%). M.P. 245–250° C. (dec.).

IR: $\nu_{max}^{KBr}$ 1800, 1615, 1538, 1360 cm.$^{-1}$.

UV: $\lambda_{max}^{1\% NaHCO_3}$ 237 nm. ($\epsilon$ 19500), 275 nm. ($\epsilon$ 12000), 310 nm. (sh) ($\epsilon$ 5700).

NMR: $\delta_{ppm.}^{D_2O+K_2CO_3}$ 3.35 (1 H, d, 18 Hz, 2-$\underline{H}$), 3.76 (1 H, d, 18 Hz, 2-$\underline{H}$), 4.00 (1 H, d, 10 Hz, 3-$C\underline{H}_2$), 4.48 (1 H, d, 10 Hz, 3-$C\underline{H}_2$), 4.93 (1 H, d, 4 Hz, 6-$\underline{H}$), 5.32 (1 H, d, 4 Hz, 7-$\underline{H}$), 7.46 (1 H, d, 10 Hz, pyridazine-$\underline{H}$), 8.18 (1 H, d, 10 Hz, pyridazine-$\underline{H}$).

Analysis.—Calcd. for $C_{12}H_{11}N_7O_3S_2$: C, 39.44; H, 3.03; N, 26.83; S, 17.55. Found: C, 39.19; H, 2.71; N, 26.84; S, 17.35.

The following examples are given in illustration of, but not in limitation of, the present invention. All temperatures are in degrees Centigrade. 7 - aminocephalosporanic acid is abbreviated as 7-ACA; —ACA— represents the moiety having the structure

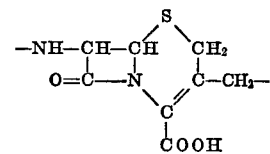

and thus 7-ACA can be represented as

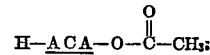

Methyl isobutyl ketone is represented as MIBK. "Skellysolve B" is a petroleum ether fraction of B.P. 60–68° C. consisting essentially of n-hexane.

DESCRIPTION OF THE PREFERRED EMBODIMENTS

Example 1

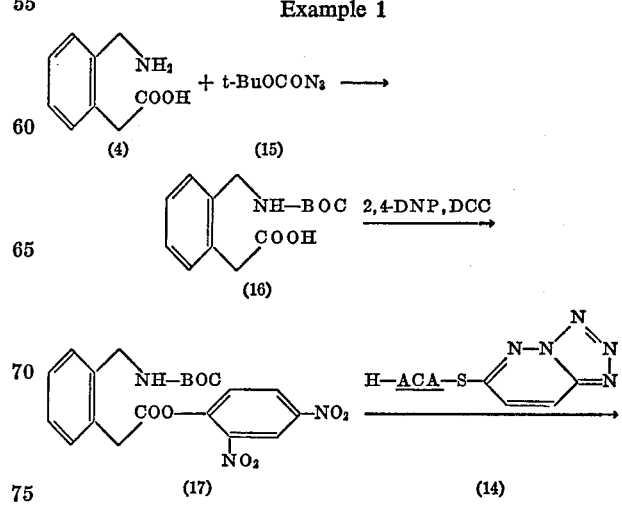

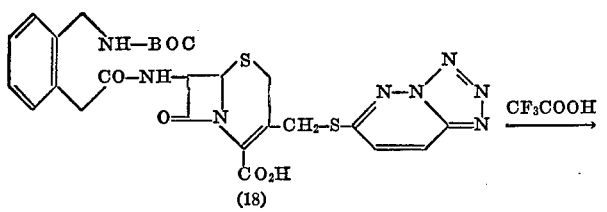

(18)

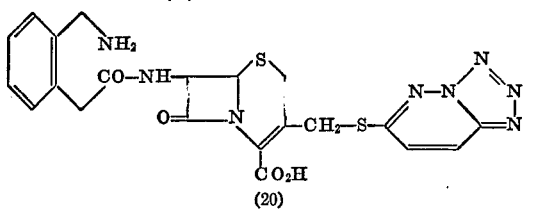

(20)

t-Butoxycarbonyl azide (15)

To a cooled solution of 100 g. (0.76 mole) of t-butyl carbazate in 87 g. of glacial acetic acid and 120 ml. of water was added dropwise a solution of 60 g. (0.85 mole) of sodium nitrite in 50 ml. of water over a period of 40 minutes, the temperature being kept at 10–15° C. After the addition was completed the stirring was continued for an additional 30 min. at the same temperature. To the mixture was added 100 ml. of water and a separated oil was extracted with five 100 ml. portions of methylene chloride. The combined organic extracts were washed with 100 ml. of 10% sodium bicarbonate solution and 100 ml. of water successively, and dried over anhydrous sodium sulfate. The methylene chloride was removed under diminished pressure on a water bath maintained at 40–45° C. The residual azide was distilled and collected at 45° C./20 mm. Hg. It weighed 92.7 g. (84%).

o-(t-Butoxycarbonylaminomethyl)phenylacetic acid (16)

To a solution of 70 g. (0.35 mole) of o-aminomethylphenylacetic acid hydrochloride (4) and 116 g. (1.15 moles) of triethylamine (TEA) in 400 ml. of water was added dropwise a solution of 64 g. (0.45 mole) of t-butoxycarbonyl azide (15) in 300 ml. of tetrahydrofuran (THF) under stirring at 0° C. After the addition was completed, the temperature was allowed to rise to room temperature and the stirring was continued for 20 hours. The tetrahydrofuran was distilled off below 40° C. and the aqueous solution was washed with 200 ml. of ether, layered with 200 ml. of ethyl acetate and acidified with dil. hydrochloric acid to pH 3 under cooling at 0° C. The organic layer was separated and the aqueous layer was extracted with four 200 ml. portions of ethyl acetate. The combined ethyl acetate solution was washed with 200 ml. of water, dried over anhydrous sodium sulfate and concentrated in vacuo. The concentrate was treated with 500 ml. of n-hexane to give 87.9 g. (95%) of (16) as colorless needles melting at 114–116° C.

2,4-dinitrophenyl o-t-butoxycarbonylaminomethylphenylacetate (17)

Dicyclohexylcarbodiimide (17.72 g., 0.086 mole) (DCC) was added in one portion to a mixture of o-(t-butoxycarbonylaminomethyl)phenylacetic acid (16) (22.73 g., 0.086 mole) and 2,4-dinitrophenol (15.82 g., 0.086 mole) (2,4-DNP) in 250 ml. of THF. The reaction mixture was stirred for 2 hours at room temperature. The precipitated dicyclohexylurea was filtered off and washed with 100 ml. of THF. The filtrate and washings were combined and concentrated under reduced pressure below 50° to give a viscous yellow oil which was triturated with n-hexane (150 ml.) to afford (17) as yellow needles. Yield 34.9 g. (94%). M.P. 76–77° C.

IR: $\nu_{max}^{KBr}$ 3340, 1785, 1685, 1610, 1540, 1530, 1500, 1340 cm.$^{-1}$.

Analysis.—Calcd. For $C_{20}H_{21}N_3O_3$: C, 55.68; H, 4.91; N, 9.74. Found: C, 55.70; H, 5.05; N, 9.93.

7-(o - t - butoxycarbonylaminomethylphenylacetamido)-3 - (tetrazolo[4,5 - b]pyridazin - 6 - ylthiomethyl)-3-cephem-4-carboxylic acid (18)

To a solution of 20.26 g. (0.047 mole) of (17) in 150 ml. of tetrahydrofuran was added in one portion a solution of 14.40 g. (0.039 mole) of (14) and 19.19 g. (0.19 mole) of TEA in 150 ml. of 50% aqueous tetrahydrofuran at 0–5° C. The reaction mixture was stirred for 18 hours and concentrated under reduced pressure to remove the tetrahydrofuran below 30° C. The aqueous concentrate was washed with two 200 ml. portions of ether, acidified to pH 2 with dil. hydrochloric acid and extracted with five 200 ml. portions of ethyl acetate. The combined extracts were washed with two 100 ml. portions of water, dried with anhydrous sodium sulfate, treated with active carbon and filtered. Evaporation of the solvent gave a pale yellow oil which was triturated with ether to give 13.89 g. (58%) of (18). M.P. 166–173° C. (dec.).

IR: $\nu_{max}^{KBr}$ 1770, 1710, 1690, 1535, 1370, 1255, 1170 cm.$^{-1}$.

Analysis.—Calcd. for $C_{26}H_{28}N_8O_6S_2 \cdot H_2O$: C, 49.51; H, 4.79; N, 17.77; S, 10.17. Found: C, 49.58; 49.65; H, 4.15; 4.59; N, 17.41; 17.66; S, 10.14.

7 - (o-aminomethylphenylacetamido)-3-(tetrazolo[4,5-b]pyridazin-6-ylthiomethyl)-3-cephem-4 - carboxylic acid (20)

To 20 ml. of trifluoroacetic acid was added in one portion 13.80 g. (0.022 mole) of 18 and the mixture was stirred for 45 minutes at 0–10° C. To the reaction mixture was added 300 ml. of ether to give (20) as the trifluoroacetate, which was collected by filtration and washed with ether. The trifluoroacetate was dissolved in 20 ml. of water and adjusted to pH 5 with ammonium hydroxide to give the zwitterion as a gummy oil which was separated by decantation and triturated with water. The solid product was collected by filtration, washed with 20 ml. of water and 200 ml. of acetonitrile successively and dried in vacuo on phosphorus pentoxide to yield 5.10 g. (45%) of (20) which was quite pure but amorphous.

Recrystallization of (20).—The amorphous powder (3.50 g.) was dissolved in 400 ml. of 50% aqueous tetrahydrofuran with heating at 60–70° C. under vigorous stirring. The solution was treated with a small amount of active carbon. The filtrate was cooled, scratched with a glass rod and allowed to stand overnight in a refrigerator to give 2.27 g. of (20) as fine needles melting at 190–193° C. (dec.).

Analysis.—Calcd. for $C_{21}H_{20}N_8O_4S_2 \cdot 1\frac{1}{2}H_2O$: C, 46.74; H, 4.30; N, 20.77; S; 11.89. Found: C, 47.18, 47.37; H, 4.08, 3.88; N, 20.93, 20.23; S, 12.03.

Example 2

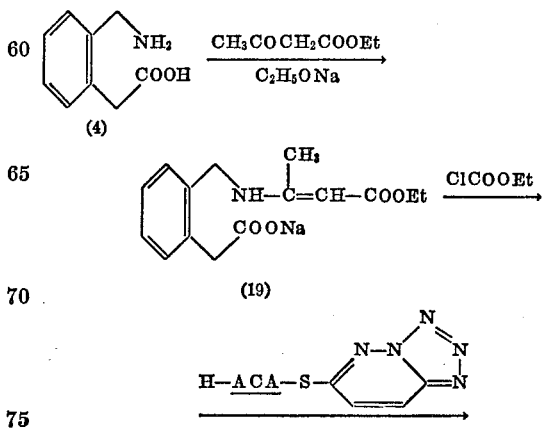

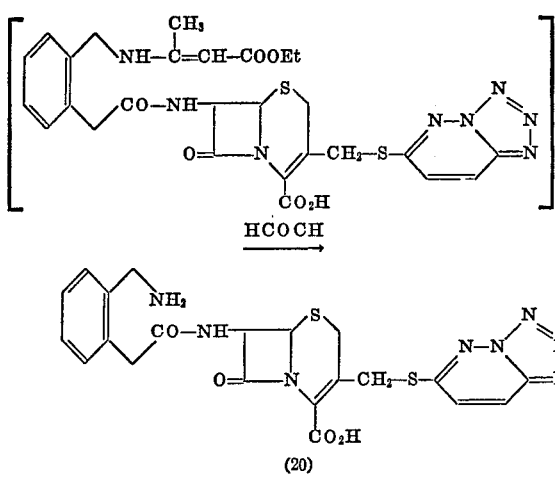

Sodium o-(1-Ethoxycarbonyl-1-propen-2-ylaminomethyl) phenylacetate (19)

To an alcoholic sodium ethoxide solution (metallic sodium 5.75 g. (0.25 atom) and absolute ethanol 500 ml.) were added 41.26 g. (0.25 mole) of o-aminomethylphenylacetic acid (obtained by neutralization of the hydrochloride (4) with aqueous ammonia) and 32.5 g. (0.25 mole) of ethyl acetoacetate successively. The mixture was refluxed for 6 hours and treated with active carbon and filtered through diatomaceous earth ("Dicalite"). The filter bed was washed with 200 ml. of hot ethanol. The combined filtrate and washings were evaporated to near dryness and cooled to 0° to give (19) as colorless needles which were collected by filtration, washed with 200 ml. of ethanol and dried in vacuo over $P_2O_5$. The solid (19) weighed 44.51 g. An additional amount of (19) was obtained by concentration of the mother liquor. Total yield 56.51 g. (76%). M.P. 231–232° C. (dec.).

7-(o-aminomethylphenylacetamido)-3-(tetrazolo[4,5-b] pyridazin-6-ylthiomethyl)-3-cephem-4 - carboxylic acid (20)

Ethyl chloroformate (6.87 gg., 0.0063 mole) was added in one portion to a stirred suspension of 17.44 g. (0.057 mole) of sodium o-(1-ethoxycarbonyl-1-propen-2-ylaminomethyl)phenylacetate (19) in 200 ml. of dry THF containing 1 ml. of N,N-dimethylbenzylamine at —15°. Stirring was stopped and a cooled solution of 20.80 g. (0.057 mole) of (14) and 9.60 g. (0.095 mole) of triethylamine in 200 ml. of 50% aqueous THF was added slowly along the wall. The mixture was stirred vigorously for 30 min. at 0–15°, treated with active carbon and filtered through "Dicalite." The bed was washed with 50 ml. of 50% aqueous THF containing 8 ml. of triethylamine. Formic acid (3 ml.) was added to a combined solution of the filtrate and the washings to precipitate unreacted 7-ACA (2.5 g.) which was filtered off. The filtrate was mixed with 200 ml. of ether and then 15 ml. of formic acid. The mixture was stirred for 10–15 min. at room temperature and the resulting precipitate was collected by filtration, washed with 100 ml. of ether and 500 ml. of water successively and dried in vacuo on $P_2O_5$ to yield 23.05 g. (79%) of (20), M.P. 180–186° (dec.).

Recrystallization of (20).—The amorphous product described above (12.93 g.) was dissolved in 1.2 l. of 50% aqueous THF at 50–60° under vigorous stirring, treated with 5 g. of active carbon and filtered. The filtrate was seeded and stored in a refrigerator overnight to give 7.80 g. of (20) as fine needles. M.P. 186–189° (dec.).

Example 3

A suspension of the zwitterionic form of 7-(o-aminomethyl-phenylacetamido)-3 - (tetrazolo[4,5-b]pyridazin-6-ylthiomethyl)-3-cephem - 4 - carboxylic acid (0.361 g.) in 3 ml. of methanol is cooled in ice and treated with a few drops of concentrated hydrochloric acid until a clear solution is obtained. 7-(o-Aminomethylphenylacetamido) - 3 - (tetrazolo[4,5-b]pyridazin-6-yl-thiomethyl)-3-cephem-4-carboxylic acid hydrochloride precipitates as a pale brown colored solid upon the addition of ether and is collected by filtration and dried in vacuo over $P_2O_5$.

Example 4

To a stirred suspension of the switterionic form of 7-(o-aminomethylphenylacetamido) - 3 - (tetrazolo[4,5-b] pyridazin - 6 - ylthiomethyl)-3-cephem - 4 - carboxylic acid (0.361 g.) is added 1 N aqueous sodium hydroxide at room temperature until a clear solution (pH 10.8) is obtained. This solution is immediately freeze-dried to give impure, solid sodium 7-(o-aminomethylphenylacetamido) - 3 - (tetrazolo[4,5-b]pyridazin-6-ylthiomethyl)-3-cephem-4-carboxylate.

PREPARATIONS OF DIMETHANESULFONATE

Example 5

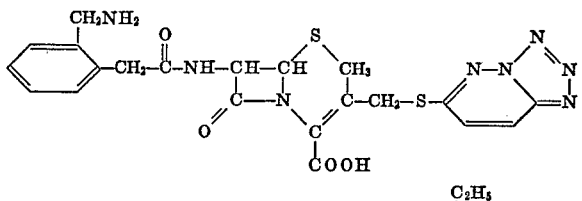

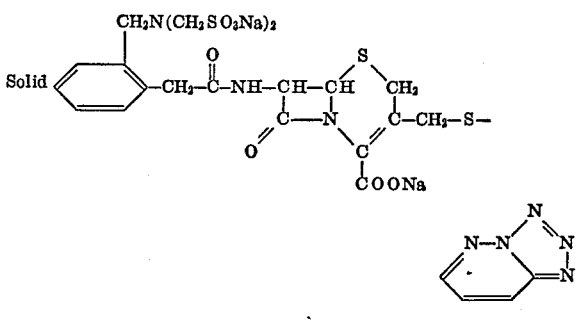

$+ H_2O + EHO.$

Procedure: Put 2.0 moles (about 1025 g. on an anhydrous basis) of 7-(o-aminomethylphenylacetamido-3-(tetrazolo[4,5-b]pyridazine-6-ylthiomethyl)-3 - cephem-4-carboxylic acid, 540 g. of sodium formaldehyde bisulfite (4.03 moles), 3000 ml. of water and 2700 ml. (4.87 moles) of 30% SEH (sodium 2-ethylhexanoate) in acetone in a suitable tank and with stirring heat the mixture to 40–45° C. The mixture dissolves in about 10 min. to a yellow solution.

After 15 minutes of heating add 50 g. of decolorizing charcoal ("Darco KB") to the solution and stir 15 minutes more at 40–45° C.

Filter through diatomaceous earth ("Dicalite") after heating the reaction at 40–45° C. for a total of 30 minutes.

Wash the carbon cake with 2000 ml. of 50% ethanol-water.

Combine the filtrates, adjust to 25° C. and add the solution at 25° C. to 112 liters of rapidly stirred 100% ethyl alcohol. A fine white amorphous precipitate of the di(sodium-methane sulfonate) of sodium 7-(o-aminomethylphenylacetamido-3-(tetrazolo[4,5-b]pyridazin - 6-ylthiomethyl)-3-cephem-4-carboxylate forms.

Stir the suspension for about 10 minutes and then filter and wash the cake with 15 liters of 100% ethyl alcohol.

Dry the cake at 50–55° C. in an oven with air circulating for about 2 hours and then under vacuum at 4–6 mm. for 24 hours.

The yield is about 1200–1400 g. of amorphous, white, solid di(sodium-methane sulfonate) of sodium 7-(o-aminomethylphenylacetamido)-3-(tetrazolo[4,5-b]pyridazin - 6-ylthiomethyl)-3-cephem - 4 - carboxylate. The product usually contains several percent water and possibly a trace of ethanol.

This product is also named sodium 7-[o-N,N-bis(sodiosulfomethyl)aminomethylphenylacetamido]-3 - (tetrazolo[4,5-b]pyridazin-6-ylthiomethyl)-3-cephem - 4 - carboxylate.

Example 6

The following slurry is prepared:

2.19 grams of sodium-formaldehyde bisulfite (2 equivalents).

3.5 g. of 7-(o-aminomethylphenylacetamido)-3-(tetrazolo[4,5-b]pyridazin-6-ylthiomethyl)-3-cephem-4 - carboxylic acid zwitterion (100–200 mesh).

25 ml. of water (volume can be varied).

14 ml. of 30% SEH-isopropanol.

A near solution is obtained in about 0.5 hour of rapid stirring at 24° C. The temperature of the mixture is raised rapidly to 40–43° C. This is maintained for about two minutes and then rapidly cooled to 20–23° C.

The solution is filtered to remove some insolubles (total time in solution should not exceed two hours).

The pH 7.3 solution is added over a 5 minute period to 600 ml. of very rapidly stirring absolute ethanol (other alcohols such as anhydrous isopropanol may be used). An amorphous precipitate of the di(sodium-methane sulfonate) of sodium 7-(o-aminomethylphenylacetamido)-3-(tetrazolo[4,5-b]pyridazin-6-ylthiomethyl)-3-cephem - 4-carboxylate forms. The mixture is stirred for 5 minutes. The precipitate is collected by filtration, washed with 60 ml. of ethanol (or isopropanol) and vacuum dried at 50° C. for 24 hours. The yield is about 4.3 g.

The product is soluble in water at about pH 7 to the extent of at least 200 mgm./ml. Such a solution is stable for at least two hours at room temperature; more dilute solutions are stable even longer. The product shows the same antibacterial spectrum as the parent zwitterion and is fully biologically active whether it has hydrolyzed back to the zwitterion or not.

Example 7.—Sodium 7-[o - N,N - bis(sodiosulfomethyl) aminomethylphenylacetamido] - 3 - tetrazolo[4,5 - b] pyridazin-6-ylthiomethyl)-3-cephem-4-carboxylate Preparation using hydroxymethanesulfonate: A mixture of 1 g. (1.95 mmole) of 7(o-aminomethylphenyl-acetamido-3-(tetrazolo[4,5-b]pyridazin-6 - ylthiomethyl)-cephem-4-carboxylic acid, 1.52 g. (10 mmole) of sodium hydroxymethanesulfonate monohydrate, 6 ml. (6 mmole) of 1 M SEH solution in ethyl acetate, 10 ml. of isopropanol and 10 ml. of water was stirred at room temperature for 3.5 hr. The resulting solution was treated with 1 g. of active carbon and poured under stirring into 300 l. of abs. ethanol and the mixture was stirred at room temperature for 30 min. to give the crystalline product which was collected by filtration, washed with three 50 ml. portions of abs. ethanol and dried over $P_2O_5$ at 45–52°/1 mm. for 20 hr. to give 1.51 g. of sodium 7 - [o - N,N - bis(sodiosulfomethyl)aminomethyl-phenylacetamido]-3-(tetrazolo[4,5-b]pyridazin-6 - ylthio-methyl)-3-cephem-4-carboxylate which was readily soluble in water (>1 g./ml.). M.P. >270°.

IR: $\nu_{max.}^{KBr}$ 1760, 1660–1620, 1605, 1540, 1400, 1200, 1040 cm.$^{-1}$.

UV: $\lambda_{max.}^{H_2O}$ 242 nm. ($\epsilon$ 18,000), 271 nm. ($\epsilon$ 11,600, sh), 312 nm. ($\epsilon$ 5,100, sh).

NMR: $\delta_{p.p.m.}^{D_2O}$ 3.34 (1H, d, 18 Hz., S—C$\underline{H}_2$), 3.76 (1H, d, 18 Hz., S—C$\underline{H}_2$), 3.85 (2H, s, CO—C$\underline{H}_2$—$\phi$), 4.04 (4H, N—C$\underline{H}_2$—$\phi$ & 3-C$\underline{H}_2$—S), 4.30 (4H, s, N—C$\underline{H}_2$—SO$_3$Na), 4.92 (1H, d, 4.5 Hz., 6-H), 5.42 (1H, d, 4.5 Hz., 7-H), 7.05–7.30 (4H, phenyl-H), 7.40 (1H, d, 10 Hz., pyridazine-H), 8.11 (1H, d, 10 Hz., pyridazine-H).

Example 8

Preparation using formalin and sodium bisulfite: (a) To a solution of 1 ml. (10 mmole) of 30% formalin and 1 g. of sodium bisulfite in 10 ml. of water was added successively 1.026 g. (2 mmole) of 7-(o-aminomethylphenylacetamido)-3-(tetrazolo[4,5-b]pyridazin-6 - ylthiomethyl)-3-cephem-4-carboxylic acid, 6 ml. of 1 M SEH solution and 10 ml. of isopropanol. The mixture was stirred for 2.5 hours at room temperature and poured into 300 ml. of ethanol. The resulting sodium 7-[o-N,N-bis(sodiosulfomethyl) aminomethylphenylacetamido] - 3-(tetrazolo[4,5-b]pyridazin-6-ylthiomethyl)-3-cephem - 4-carboxylate was collected by filtration, washed with three 50 ml. portions of ethanol and dried in vacuo. Yield 1.61 g.

(b) To a mixture of 1.026 g. (2 mmole) of 7-(o-aminomethylphenylacetamido-3-(tetrazolo[4,5-b]-pyridazin - 6-ylthiomethyl)-3-cephem-4-carboxylic acid, 6 ml. of 1 M SEH in ethyl acetate, 10 ml. of isopropanol and 10 ml. of water was added 1 ml. (10 mmole) of 30% formalin. The mixture was stirred for 2 hours at room temperature to give a clear solution with a small amount of oily precipitate. After 1 g. of sodium bisulfite was added, the solution was stirred for an additional 2 hours, during which time the oily precipitate dissolved in the solution. The reaction mixture was poured into 300 ml. of ethanol under vigorous stirring to give 1.61 g. of sodium 7-[o-N,N-bis(sodiosulfomethyl)aminomethylphenylacetamido] - 3-tetrazolo[4,5-b]pyridazin-6-ylthiomethyl)-3 - cephem - 4-carboxylate which was collected by filtration, washed with three 50 ml. portions of ethanol and dried in vacuo.

IN VITRO AND IN VIVO STUDIES

7-[(o-aminomethyl)phenylacetamido] - 3 - (tetrazolo-[4,5-b]pyridazin-6-ylthiomethyl) - 3 - cephem - 4 - carboxylic acid, is a new broad-spectrum semi-synthetic cephalosporin having the structure shown below.

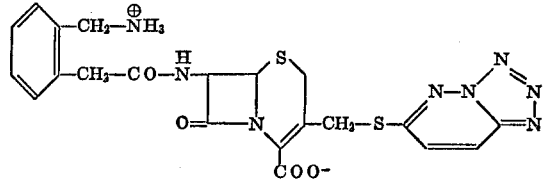

It has been shown to possess excellent in vitro and in vivo activities against a wide variety of Gram-positive and Gram-negative bacteria including those which are resistant to cephalothin and cephaloridine. Its dimethane-sulfonate adduct having the structure

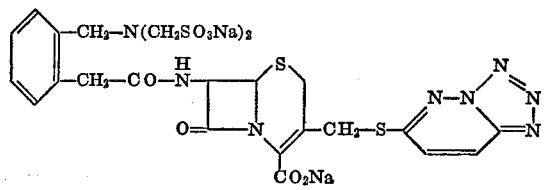

was prepared as a water-soluble preparation useful for injection and for studies of absorption and excretion, acute toxicity and pain liability upon injection.

Initial studies of *in vitro* antibacterial activity by the tube dilution method or agar dilution method of this new cephalosporin showed Minimum Inhibitory Concentrations (M.I.C.'s) of less than 1.0 mcg./ml. for all or nearly all strains tested of *Staphylococcus aureus, Streptococcus pyogenes, Diplococcus pneumoniae*, various Bacillus species including *Bacillus anthracis, mycoides* and *cereus, Klebsiella pneumoniae, Proteus rettgeri,* Shigella and especially *Shigella flexneri, Salmonella enteritidis* and *Salmonella typhosa* and M.I.C.'s usually less than 4 mcg./ml. and often less than 1.0 mcg./ml. against various strains of *Escherichia coli,* Klebsiella unspeciated, *Proteus vulgaris, Proteus morganii, Proteus mirabilis* and *Enterobacter cloacae.*

This series of Gram-negative test organism included 14 strains of cephalothin-resistant Enterobacteriacae (3 *E. coli,* 6 Proteus, 1 Enterobacter, 1 Shigella and 3 Serratia) which were not inhibited by 100 mcg./ml. of cephalothin and in many cases not inhibited by 100 mcg./ml. of cephaloridine and cephapirin. The compound of this invention was remarkably active against these organisms, inhibiting 12 of the 14 strains at 6.3 mcg./ml. or less.

The M.I.C.'s of this compound were not substantially reduced in the presence of moderate concentrations of human serum, e.g. up to 50%. The compound in solution at 37° C. was highly stable at pHs ranging from 4.6 to 8.4 with half-lives exceeding 24 hours.

The *in vivo* efficacy of this compound by subcutaneous injection was studied in mice having experimental infections caused by 10 pathogenic bacteria including penicillinase-positive *S. aureus* and cephalosporinase-positive *E. coli*. The bacteria used were strains of *S. aureus, S. pyogenes, D. pneumoniae, E. coli, K. pneumoniae, P. vulgaris* and *S. marcescens.* The median curative dose (CD$_{50}$) never exceeded 20 mgm./kg., only twice exceeded 10 mgm./kg. and in seven instances was 3.2 mgm./kg. or less with a minimum of 0.2 mgm./kg.

Blood levels in mice after subcutaneous injection of this compound at doses as low as 5 mgm./kg. were determined and showed excellent absorption; urinary recovery was good (about 60%) and paper chromatography of the urine showed this compound to be the only bioactive substance present, indicating metabolic stability.

Acute toxicity tests in mice by intravenous administration of doses as high as 1000 mgm./kg. showed no deaths. Two tests designed to measure local tissue irritation after injection showed no irritation at concentrations of 12.5% or less.

We claim:

1. The compound of the formula

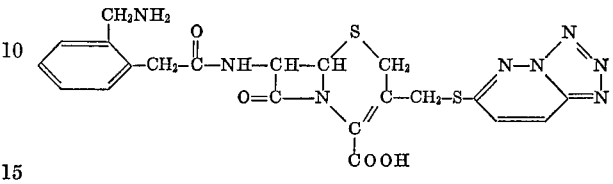

2. The sodium salt of the compound of claim 1.
3. The potassium salt of the compound of claim 1.
4. The hydrochloride of the compound of claim 1.
5. The zwitterion form of the compound of claim 1.
6. A nontoxic, pharmaceutically acceptable acid addition salt of the compound of claim 1.
7. The compound of the formula

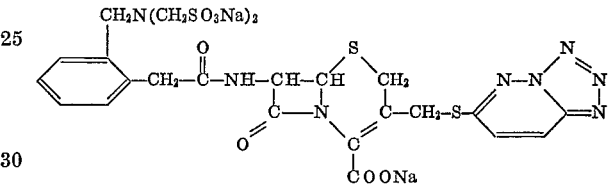

References Cited

UNITED STATES PATENTS 3,641,021  2/1972  Ryan _____ 260—243 C

NICHOLAS S. RIZZO, Primary Examiner

M. C. VAUGHN, Assistant Examiner

U.S. Cl. X.R.

424—246; 260—250